United States Patent [19]

Patel

[11] Patent Number: 5,040,666

[45] Date of Patent: Aug. 20, 1991

[54] VIBRATING TWO MASS CONVEYOR APPARATUS

[75] Inventor: Kirit Patel, Louisville, Ky.

[73] Assignee: Carrier Vibrating Equipment, Inc., Louisville, Ky.

[21] Appl. No.: 469,936

[22] Filed: Jan. 25, 1990

[51] Int. Cl.⁵ .............................................. B65G 27/28
[52] U.S. Cl. ................................... 198/760; 198/764
[58] Field of Search ................ 198/759, 760, 763, 764

[56] References Cited

U.S. PATENT DOCUMENTS

| 2,664,995 | 1/1954 | Renner | 198/760 |
| 2,725,984 | 12/1955 | Klemencic | 198/763 X |
| 2,794,539 | 6/1957 | Philippovic | 198/760 |
| 2,797,796 | 7/1957 | Carrier, Jr. et al. | 198/760 |
| 2,936,064 | 5/1960 | Schuessler | 198/760 |
| 2,951,581 | 9/1960 | Long et al. | 198/763 |
| 3,291,289 | 12/1966 | Savage | 198/760 |
| 3,467,241 | 9/1969 | Oser | 198/763 X |
| 3,630,342 | 12/1971 | Danyluke | 198/760 X |
| 3,834,523 | 9/1974 | Evans | 198/763 |
| 4,260,051 | 4/1981 | Burghart | 198/763 X |

FOREIGN PATENT DOCUMENTS

| 177112 | 12/1953 | Fed. Rep. of Germany | 198/763 |
| 1288980 | 2/1969 | Fed. Rep. of Germany | 198/763 |
| 368415 | 3/1973 | U.S.S.R. | 198/764 |
| 0659474 | 4/1979 | U.S.S.R. | 198/764 |
| 0844509 | 8/1981 | U.S.S.R. | 198/764 |
| 1230932 | 5/1986 | U.S.S.R. | 198/764 |

Primary Examiner—D. Glenn Dayoan
Attorney, Agent, or Firm—Jon C. Winger

[57] ABSTRACT

A vibrating two mass conveyor apparatus for conveying material includes a driven mass, which defines the vibratory material conveying path, and a driver mass for imparting a vibrating conveying force to the driven mass. A vibratory driven is operatively associated with the driver mass for imparting a vibratory force to the driver mass. The driven mass is located adjacent the driver mass, and is connected to the driver mass by resilient devices, such as coil springs. Link arms also interconnect the driven mass and driver mass, with the one end of each arm pivotally connected to the driven mass the other end pivotally connected to the driver mass. Supports connected to the link arms proximate the nodes of the link arms connect the apparatus to a support structure, such as the floor or roof of a building in which the conveyor apparatus is installed.

14 Claims, 2 Drawing Sheets

VIBRATING TWO MASS CONVEYOR APPARATUS

BACKGROUND OF THE INVENTION

1. Field of the invention

The present invention relates to vibrating conveyor apparatus, and more particularly to a two mass vibrating conveyor apparatus.

2. Discussion of the Prior Art

Two mass vibrating conveyor apparatus are known.

Typically, these prior-art two mass vibrating apparatus include a driver mass, or exciter, with a vibratory drive attached thereto to impart a vibratory force to the exciter, a driven mass or conveyor deck is located above or below exciter mass along which the material is conveyed. The conveyor deck is connected to the exciter mass by resilient devices such as springs which transmit the vibratory force from the exciter mass to the conveyor deck. These heretofore known apparatus are connected to a stationary support, such as the roof or floor of a facility in which it is installed, by isolation springs. In one known apparatus, the isolation springs interconnect the exciter mass to the floor of the facility. In another known apparatus, the isolation springs interconnect the exciter mass to the roof structure of the facility. In yet another known apparatus, the isolation springs interconnect the conveyor deck to the floor of the facility. And in still another apparatus, the isolation springs interconnect the conveyor deck to the roof structure of the facility.

A problem inherent in all of these prior-art apparatus is that the dynamic reaction of the vibrating masses is transmitted to the support structure, which reaction is in direct proportion to the spring-rate of the isolation springs and to the motion or displacement of the vibrating masses. This dynamic reaction can have a deleterious effect on the support structure.

SUMMARY OF THE INVENTION

The present invention recognizes these drawbacks of the heretofore known two mass vibrating conveyor apparatus and provides a solution thereto.

More particularly, the present invention provides a vibratory two mass conveyor apparatus comprising a driven mass defining a vibratory conveying path along which a material to be conveyed moves, a driver mass, or exciter, for imparting a vibratory force to the driven mass, drive means operatively associated with the driver mass for imparting a vibratory force to the driver mass, resilient means interconnecting the driver mass to the driven mass to transmit the vibratory force from the driver mass to the driven mass, link arms interconnecting the driver mass and driven mass, each link arm being pivotally connected at one end to the driven mass and pivotally connected at the other end to the driver mass, and apparatus support means interconnecting at least some of the link arms, proximate the node of the link arms, to a stationary support structure.

BRIEF DESCRIPTION OF THE DRAWINGS

A better understanding of the present invention will be had upon reference to the following discussion in conjunction with the accompanying drawings, wherein like numerals refer to like parts throughout the several views and in which.

DETAILED DESCRIPTION OF THE PREFERRED EMBODIMENTS

Figure 1:
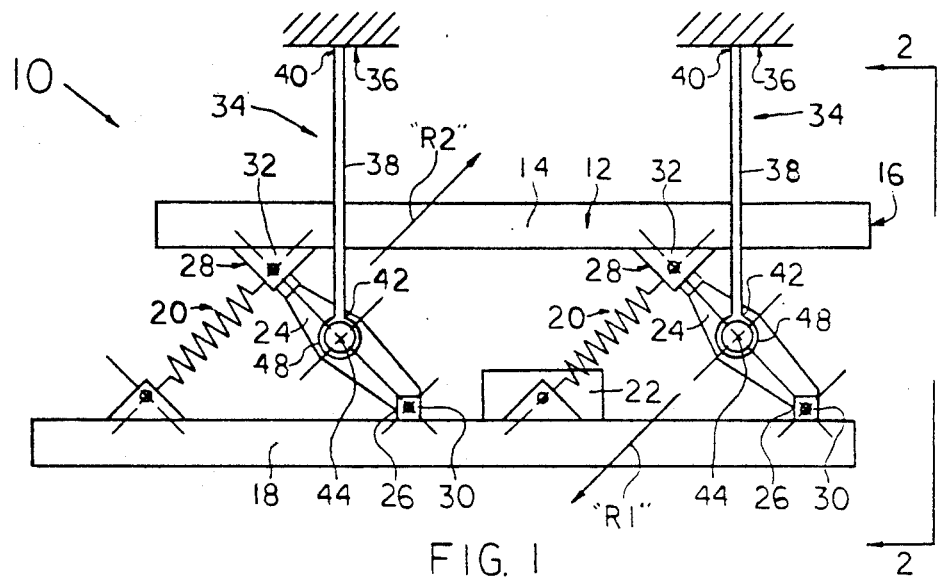
FIG. 1 is a schematic side view of one embodiment of a vibrating two mass conveyor apparatus of the present invention.
Figure 2:
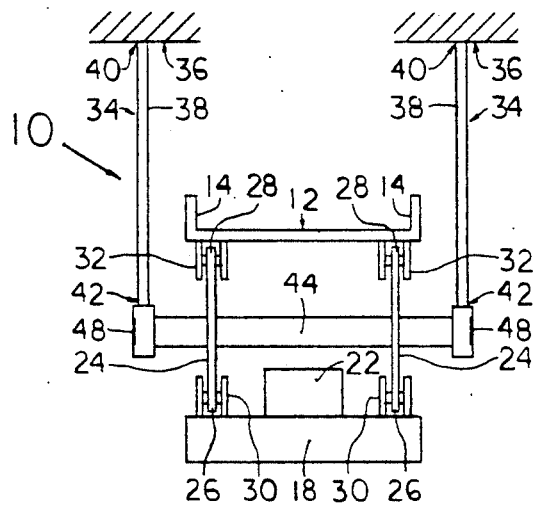
FIG. 2 is an end view of the apparatus of FIG. 1.

With reference to FIGS. 1 and 2, there is shown a vibrating two mass conveyor apparatus, generally denoted as the numeral 10 of the present invention for coveying a material.

The apparatus 10 includes a driven mass 12 which defines the conveying path for the material and a driver mass 18 located adjacent to the driven mass 12. The driven mass 12 can be of various physical shapes or configurations. For example, the driven mass 12 is shown as an elongated trough or pan having upstanding longitudinal walls 14 and an open conveyed material discharge end 16. In two mass conveyor apparatus, the driver mass 18 can be located either above or below the driven mass 12, without effecting the structure or operation of the conveyor apparatus, and are considered equivalents in every respect. Merely for the sake of brevity and to avoid redundancy of the description, the drawings illustrate, and the following discussion will describe an apparatus 10 with the driven mass 12 above the driver mass 18. The driven mass 12 is interconnected to the driver mass 18, or exciter mass, by resilient means 20, such as primary coil springs 20. Drive means 22 such as, for example, a rotating eccentric weight drive is mounted to the driver or exciter mass 18 to impart a vibratory force to the driver or exciter mass 18. The drive means 22 imparts a resultant vibrating force vector R1 to the driver mass 18 at an acute angle to the conveyor direction to the driven mass 12, and the primary springs 20 are disposed to be yieldable in the direction for the force vector R1. The primary springs 20 are selected to provide a tuned frequency of the vibrating system near the operating frequency of the drive means 22. The vibrating force of the driver mass 18 is transmitted to the driven mass 12 through the resilient means 20. The resulting motion, denoted by the vector R2 in FIG. 1, imparted to the driven mass 12 is 180° out of phase with the motion denoted by the vector R1 of the driver mass 18.

Figure 3:
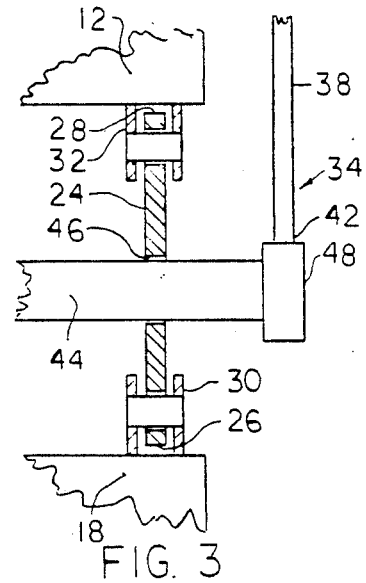
FIG. 3 is an enlarged view, partially in cross-section, of a component of the apparatus of FIGS. 1 and 2.

With continued reference to FIGS. 1 and 2, and additional reference to FIG. 3, the vibrating two mass conveyor apparatus 10 also includes a plurality of link or pivot arms 24 interconnecting the driver mass 18 and driven mass 12. As shown, there are four pivot link arms 24, each one located proximate a different corner of the apparatus 10, such that the arms are arranged in two pairs of parallel link arms, with each link arm of a pair located to opposite longitudinal sides of the driven mass 12 and driver mass 18. Each link arm 24 is pivotally connected at one of its end 26, for example its bottom end, to the driver mass 18 and is pivotally connected at the other one of its ends 28, for example its top end, to the driven mass 12. As illustrated, the end 26 of the link arm 24 is pivotally mounted to a flange 30 affixed to the driver mass 18, and the end 28 of the link arm 24 is pivotally mounted to a flange 32 affixed to the driven mass 12. In addition, as shown in FIG. 1, the end of the primary springs 20 affixed to the driven mass 12 are connected to the flange 30. When the apparatus 10 is static, the longitudinal axis of the link arms 24 is at an angle of approximatly 90° to the direction of yield of the primary springs 20.

In operation of the apparatus 10, when the driver mass 18 is moved downwardly to the left as seen in FIG. 1 in the direction of the resultant force vector R1, the driven mass 12 is moved upwardly to the right as seen in FIG. 1 in the direction of the resultant force vector R2. Likewise, when the driver mass 18 is moved upwardly to the right in the direction of the resultant force vector R1, the driven mass 12 is moved downwardly to the left in the direction of the resultant force R2. Therefore, the ends 26 and 28 of each of the link pivot arms 24 move in an opposite arcuate directions to each other. Thusly, there is a nodal point located along the longitudinal axis of each of the link pivot arms 24 between the end 26 and end 28, that is a location of minimum or zero motion or displacement. The exact location of the nodal point depends upon the weight of the components of the apparatus 10, the spring rate of the resilient means 20, and the operating frequency of the vibratory forces. The location of the nodal point is readily determined once these criteria are established for any particular two mass conveyor apparatus 10.

With continued reference to FIGS. 1-3, the vibrating two mass conveyor apparatus 10 of the invention includes apparatus mounting means, generally denoted as the numeral 34, for suspending the apparatus 10 from an overhead support structure 36, such as a roof structure of a facility in which the apparatus 10 is installed. As shown, the mounting means 34 interconnects the nodal point of the link pivot arms 24 to the support structure 36. Toward this objective, the mounting means 34 includes elongated structural members 38, such as for example rods or cables, each attached at its top end 40 to the support sturcture 36 and attached at its bottom end 42 to the nodal point of a different one of the link pivot arms. As shown, there are four such elongated structural members 38, one for each of the four link arms 24. As shown, the apparatus mounting means 34 also includes two axles 44, each axle 44 extending transversely of the driven mass 12 interconnecting the nodal points of the two link pivot arms 24 of each pair of link arms. Each link pivot arm 24 has a bearing 46 at its nodal location for receiving the axle 44 therein. The bottom end 42 of the elongated structural members 38 is attached to an end of an axle 44 protruding outwardly of the baring 46 by means of a fitting 48.

By suspending the apparatus 10 from the nodal points of the link arms 24, the dynamic reaction transmitted to the support structure 36 approaches zero in value, thusly, eliminating or at least drastically reducing the deleterious effect caused by reaction forces on the support structure 36 of heretofore known two mass apparatus.

Figure 4:
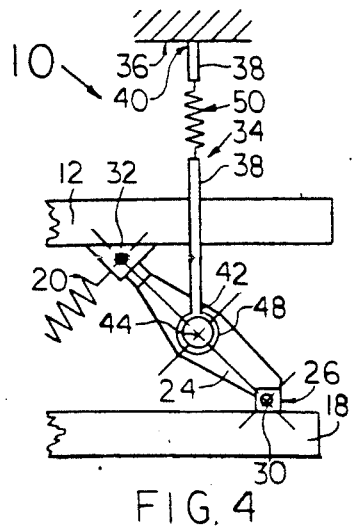
FIG. 4 is a side view of a section of the present invention of FIG. 1 illustrating a modification to the component.
Figure 5:
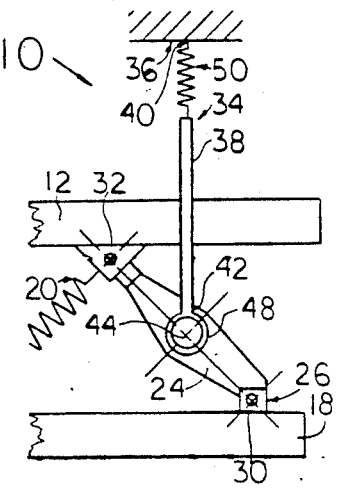
FIG. 5 is a side view of a section of the present invention of FIG. 1 illustrating another modification of a component.
Figure 6:
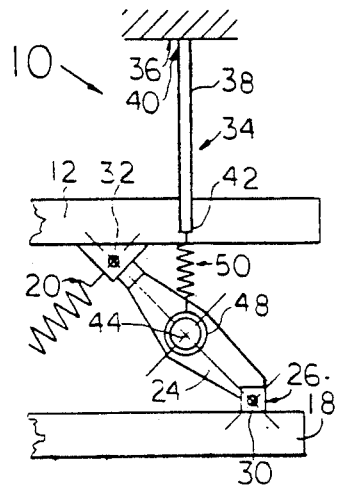
FIG. 6 is a side view of a section of the present invention illustrating yet another modificaiton of a component of FIG. 1.

It has been determined that under certain operating conditions the location of the nodal point of the link arms 24 may vary or change along the length of the link arms 24 as the apparatus operates due to variations or inconsistency of the mass of the material being conveyed on the driven mass 12. With reference to FIGS. 4, 5, and 6, the apparatus mounting means 34 further includes isolation means, generally denoted as the numeral 50 to reduce dynamic reaction or movement transmitted through the apparatus mounting means 34 to the support structure 36 due to change in the location of the nodal point of the link arms 24 as the apparatus 10 operates conveying the material on the driven mass 12. With reference to FIG. 4, the isolation means 50 is shown as a coil isolation spring located in the elongated structural members 38 between the top end 40 and bottom end 42 of the elongated structural members 38. With reference to FIG. 5, the isolation means 50 is shown as being located between and interconnecting the top end 40 of the elongated structural members 38 and the support structure 36. With reference to FIG. 6, the isolation means 50 is shown as being located between and interconnecting the bottom end 42 of the elongated structural members 38 and the axle 44 of the apparatus mounting means 34.

Figure 7:
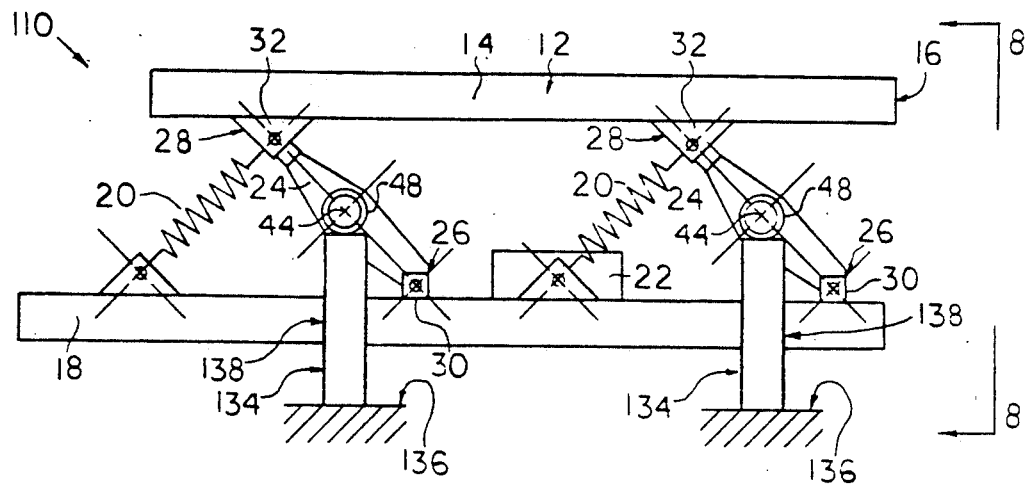
FIG. 7 is a schematic side view of another embodiment of a vibrating two mass conveyor apparatus of the present invention.
Figure 8:
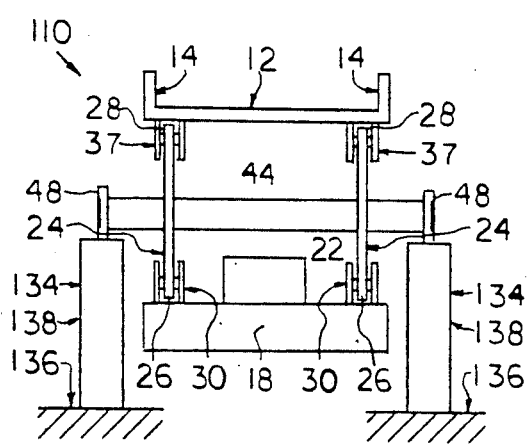
FIG. 8 is an end view of the apparatus of FIG. 7.
Figure 9:
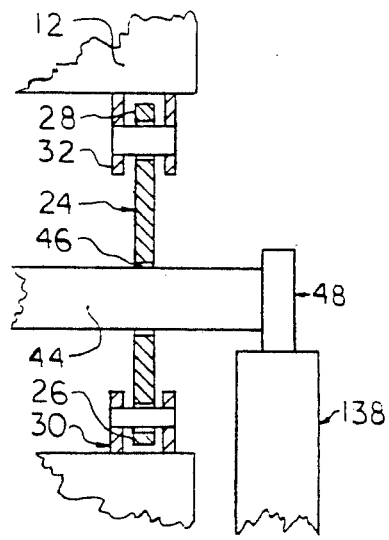
FIG. 9 is an enlarged view, partially in cross-section, of a component of the apparatus of FIGS. 7 and 8.

Now with reference to FIGS. 7-9, there is shown another preferred embodiment of the vibrating two mass conveyor apparatus, generally denoted as the numeral 110, of the presnet invention. The apparatus 110 includes most of the features of the vibrating two mass conveyor apparatus 10. Therefore, for the sake of brevity, the common features are denoted in FIGS. 7-11 by the identical numerals as used in FIGS. 1-6, and the description thereof will not be repeated and functionally similar features are denoted by similar one hundred series numerals.

With reference to FIGS. 7-8, the two mass conveyor apparatus 110 includes apparatus mounting means, generally denoted as the numeral 134 for supporting the apparatus 110 on or above an underlaying supporting structure 136, such as the floor structure of a facility in which the apparatus 110 is installed. As shown, the mounting means 134 interconnects the nodal point of the link arms 24 to the underlaying support structure 136. Toward this objective, the mounting means 134 includes pedestal means 138 mounted on the support structure 136 and the fitting 48 at its top end. The fitting 48 is attached to an end of the axles 44 protruding outwardly of the bearings 46 of the link arms 24.

As with the embodiment of FIGS. 1-2, by supporting the apparatus 110 of FIGS. 7-8 at the nodal points of the link arms 24, the dynamic reaction transmitted to the support structure 136 approaches zero in value, thusly, eliminating or reducing the deleterious effect caused by reaction forces on the support sturcture 136.

Figure 10:
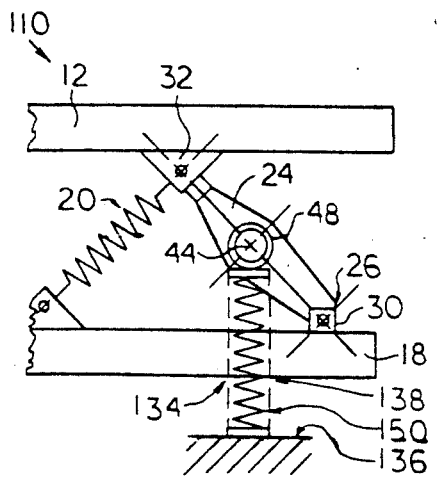
FIG. 10 is a side view of a section of the present invention of FIG. 7 illustrating a modification of a component; and, FIG. 11 is a side view of a section of the present invention of FIG. 7 illustrating another modification to a component.
Figure 11:
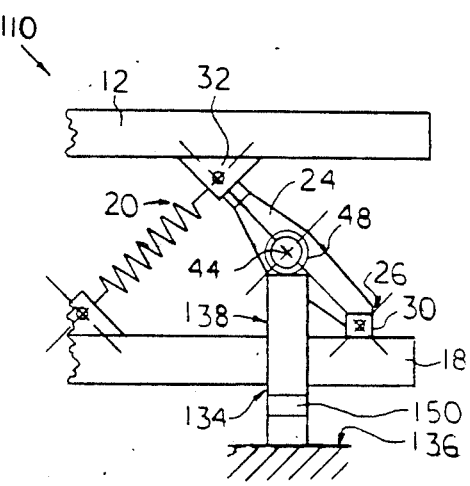

Likewise, as discussed above in regard to the apparatus 10, it has been determined that under certain operating conditions, the location of the nodal point of the link arms 24 may vary along the length of the link arm 24 due to variations or inconsistency of the mass of the material being conveyed on the driven mass 12. With reference to FIGS. 10 and 11, the apparatus mounting means 134 includes isolation means 150. As shown in FIG. 10, the isolation means 150 is a yieldable or resilient pedestal, for example, a coil spring to reduce dynamic reaction or movement transmitted to the apparatus mounting means 134 due to changes in the location of the nodal point of the link arms 24 as the apparatus 110 operates conveying the material on the driven mass 12. With reference to FIGS. 10 and 11, the apparatus mounting means 34 includes isolation means 150. As shown in FIG. 10, the isolation means 150 is a yieldable or resilient pedestal, for example, a coil spring to reduce dynamic reaction or movement transmitted through the apparatus mounting means 134 due to changes in the location of the nodal point of the link arms 24 as the apparatus operates conveying the material on the driven mass 12. The bottom end of the isolation pedestal or coil spring 150 is structurally mounted on the underlaying support structure 136 and the fitting 48 is mounted at the top end of the isolation pedestal or coil spring 150. With reference to FIG. 11, the isolation means 150 is shown as a resilient pad, for example, of an elastic material, or an pneumatic/hydraulic device such as an air filled bag.

One embodiment of the present invention provides for the virtual elimination of the dynamic reactions of a two mass conveying apparatus to zero, and another embodiment provides for the drastic reduction of dynamic reactions to a minimum valve.

The foregoing detailed description is given primarily for clearness of understanding and no unnecessary limitations are to be understood therefrom for modifications will become obvious to those skilled in the art upon reading this disclosure and may be made without departing from the spirit of the invention or scope of the appended claims.

I claim:

1. A vibratory two mass conveyor apparatus comprising:

a driven mass defining a vibratory conveyor path;

a driver mass for imparting a vibratory force to the driven mass;

drive means operatively associated only with the driver mass for imparting a vibratory force to the driver mass;

resilient means interconnecting the driver mass to the driven mass for transmitting the vibrating force from the driver mass to the driven mass;

link arms interconnecting the driver mass to the driven mass, each link arm being pivotally connected at one of its ends to the driver mass and pivotally connected at the other of its ends to the driven mass; and, apparatus mounting means interconnecting the nodal point of at least some of the link arms to a stationary support structure.

2. The vibrating two mass conveyor apparatus of claim 1, wherein the apparatus mounting means suspends the two mass apparatus from an overhead stationary support structure.

3. The vibrating two mass conveyor apparatus of claim 1, wherein the apparatus mounting means supports the two mass apparatus on an underlaying support structure.

4. The vibratory two mass conveyor apparatus of claim 1, wherein the apparatus mounting means further comprises resilient isolation means for reducing dynamic reaction transmitted through the apparatus mounting means to the stationary support structure.

5. The vibratory two mass conveyor apparatus of claim 4, wherein the apparatus mounting means suspends the two mass apparatus from an overhead stationary support structure.

6. The vibratory two mass conveyor apparatus of claim 4, wherein the apparatus mounting means supports the two mass apparatus on an underlaying stationary support structure.

7. The vibratory two mass conveyor apparatus of claim 1, wherein the apparatus mounting means is pivotally connected to the link arms.

8. The vibratory two mass conveyor apparatus of claim 1, wherein the apparatus mounting means comprises elongated structural members, each pivotally connected at its bottom end to a different one of the link arms and connected at its top end to an overhead support structure.

9. The vibratory two mass conveyor apparatus of claim 8, wherein the apparatus mounting means comprises resilient isolation means between the top end of the elongated structural member and the overhead support structure for reducing dynamic reaction transmitted through the elongated structural member to the stationary support structure.

10. The vibratory two mass conveyor apparatus of claim 8, wherein the apparatus mounting means comprises resilient isolation means between the bottom end of the elongated structural member and the nodal point of the link arm for reducing dynamic reaction transmitted through the elongated structural member to the stationary support structure.

11. The vibratory two mass conveyor apparatus of claim 8, wherein the apparatus mounting means comprises resilient isolation means between the top and bottom ends of the elongated structural member for reducing dynamic reaction transmitted through the elongated structural member to the stationary support structure.

12. The vibratory two mass conveyor apparatus of claim 1, wherein the apparatus mounting means comprises pedestal means pivotally connected at its top end to the link arms and mounted on an underlaying support structure.

13. The vibratory two mass conveyor apparatus of claim 12, wherein the pedestal means of the apparatus mounting means further comprises resilient isolation means for reducing dynamic reaction transmitted through the pedestal means to the stationary support structure.

14. The vibratory two mass conveyor apparatus of claim 1, wherein the drive means comprises a rotating eccentric weight drive.

* * * * *